Oct. 10, 1933.  W. H. SCHULTE  1,929,522
VALVE MECHANISM
Filed Feb. 25, 1929
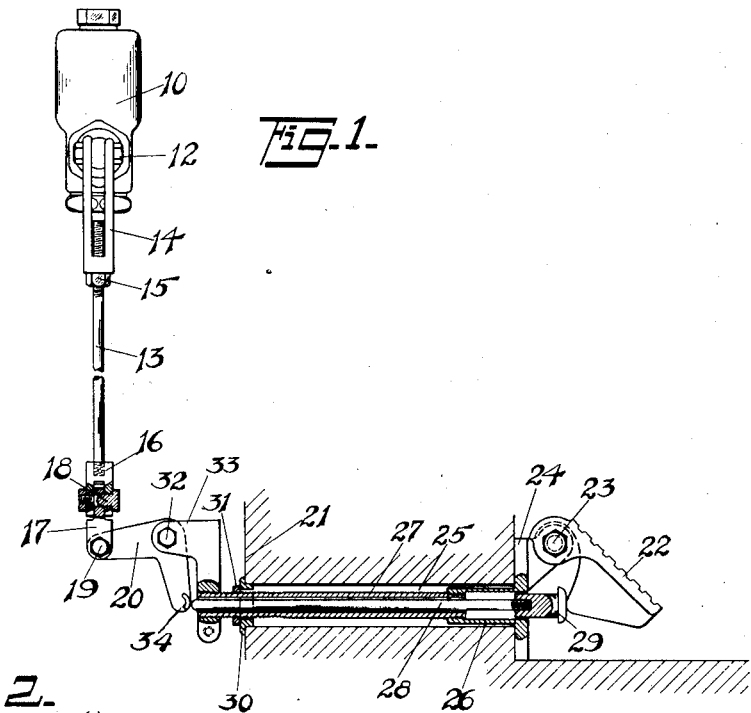
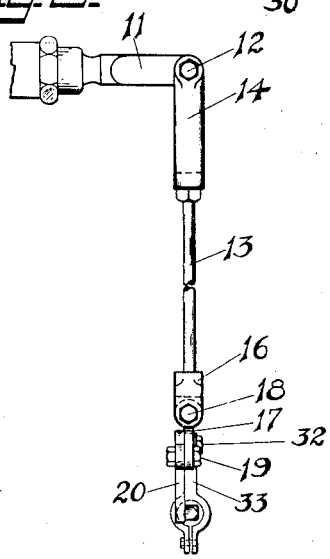

Patented Oct. 10, 1933

1,929,522

UNITED STATES PATENT OFFICE 1,929,522

VALVE MECHANISM

William H. Schulte, Trenton, N. J.

Application February 25, 1929. Serial No. 342,626

2 Claims. (Cl. 137—139)

This invention relates to valve operating mechanisms and more particularly to pedal-operated mechanisms for urinal, closet and lavatory valves. Such mechanisms include a valve which is situated behind the wall of the urinal and a pedal on the front of the wall for operating the valve through a connecting mechanism which extends through the wall.

It is an object of the invention to provide a connection permitting pivotal movement in different planes in the valve operating mechanism to obviate the necessity for accurate location of the valve.

With this object in view, the invention resides in the features, combinations, details of construction and arrangements of parts which will first be described in connection with the accompanying drawing and then more particularly pointed out.

In the drawing:

Figure 1 is a side elevational view, partly in section, of a valve operating mechanism constructed in accordance with the present invention;

Figure 2 is an elevational view, looking at the left, of the mechanism in Figure 1.

Referring to the drawing in detail, the invention is exemplified in a construction which comprises a valve 10 having an operating stem 11. The valve is shown more or less diagrammatically to indicate that it may be of any desired type and construction. The end of the stem has pivoted thereto a link which is adapted to operate the stem and valve. The link comprises a rod 13, which is connected to the end of the valve stem 11 through an adjustable fork 14 within which the valve stem is pivoted by a set screw or bolt 12. The rod 13 has a screw-threaded engagement in the fork and may be adjusted therein so that the effective length of the link may be conveniently varied. A retaining nut 15 is threaded on the rod 13 against the fork 14.

The lower end of the rod 13 also terminates in a fork 16 which is threaded thereon. A short link 17 having angularly disposed faces is pivoted by a bolt 18 within the fork 16. The lower end of the shorter link is, in turn, pivoted at 19 to a bell crank operating lever 20. The axes of pivots 18, 19 are at an angle, preferably perpendicular, to each other.

The short link 17 provides a self-adjusting connection between the bell crank lever and the valve stem. The pivot 18 permits pivotal movement of rod 13 in one plane and the pivot 19 permits pivotal movement of the short link 17 in a plane at an angle to the first plane and substantially perpendicular thereto. The rod 13 may, consequently, pivot in planes perpendicular to each other and the connecting mechanism adapt itself to a variation in the positioning of the valve.

The valve is positioned on the inner side and behind a wall 21 in a space for workmen to enter and is adapted to be operated by a pedal 22 on the front side of the wall. In the illustrated embodiment, the pedal is pivoted, as at 23, to a flange 24 having a hollow stem which passes into a hole 25 located near the bottom of the wall and extending entirely through the wall. The pivot 23 is a bolt which prevents pilfering of the pedal, unless a tool is employed. The hollow stem 26 has a screw-threaded engagement with a sleeve 27 which is disposed within the hole in the wall and has an end projecting from the inner side thereof. A plunger 28 is positioned within the sleeve and has a detachable head 29 which is engaged and operated by the pedal so that the plunger is moved back and forth within the sleeve. The head of the plunger works back and forth in the hollow stem 26. The end of the plunger projects from the inner end of the sleeve and contacts with a projection 34 on the bell crank. The movement of the plunger thus imparts an oscillating movement to the bell crank which is communicated into an operating movement of the valve stem through the connecting mechanism already described.

That portion of the mechanism extending through the wall is adjustable to adapt it for application to walls of different thicknesses. The flange 24 abuts the outer surface of the wall and the sleeve which extends through the wall is clamped in place by a collar 30 and nut 31, the latter having a screw-threaded engagement on the exterior of the sleeve. The threads on the end of the sleeve are arranged over a considerable length of the sleeve so that the effective length between flange 24 and collar 30 may be adjusted within wide limits to adapt the sleeve for application to walls of different thicknesses. In the embodiment shown, the bell crank lever is pivoted at 32 to angle 33 which, in turn, is supported on the projecting end of sleeve 27, and is screw-threaded or clamped thereon.

In the operation of the mechanism, after the lavatory or urinal has been used, the pedal 22 is depressed by the foot, the plunger is forced inward and into the wall, acts upon the bell crank lever and causes operation of the valve to flush the toilet. When the foot is taken off the pedal, the original position is resumed, a spring in the valve or the weight of the parts forcing the bell crank back to starting position.

What is claimed is:

1. A valve mechanism adapted to be mounted through a wall, comprising a valve and its stem on one side of the wall, a pedal for operating said stem on the opposite side of the wall, a sleeved plunger extending through said wall, an angle member carried by said sleeve on the valve side of said wall, a bell crank lever pivoted on said angle member with one arm thereof in alignment with said plunger, a stem operating rod having one end pivotally connected to the stem, and a pivotal connection between the other end of said stem operating rod and the second arm of said bell crank lever comprising a universal joint.

2. A valve mechanism adapted to be mounted through a wall, comprising a valve and its stem on one side of the wall, a pedal for operating said stem on the opposite side of the wall, a sleeved plunger extending through said wall, an angle member carried by said sleeve on the valve side of said wall, a bell crank lever pivoted on said angle member with one arm thereof in alignment with said plunger, a fork pivotally secured to said valve stem, a stem operating rod having one end adjustably connected to said fork, and a pivotal connection between the other end of the stem operating rod and the second arm of said bell crank lever comprising a fork secured to the stem operating rod and a link having angularly disposed faces pivotally secured respectively in said fork and on said arm of the bell crank lever and arranged to form a universal joint.

WILLIAM H. SCHULTE.